United States Patent
Yeh et al.

(10) Patent No.: US 11,416,449 B2
(45) Date of Patent: Aug. 16, 2022

(54) METHOD OF SYNCHRONOUS DELETION FOR DISTRIBUTED STORAGE SYSTEM

(71) Applicant: NATIONAL APPLIED RESEARCH LABORATORIES, Taipei (TW)

(72) Inventors: Lo-Yao Yeh, Taichung (TW); Peggy Joy Lu, Taichung (TW); Chia-Hsien Hung, Taichung (TW)

(73) Assignee: National Applied Research Laboratories, Taipei (TW)

( * ) Notice: Subject to any disclaimer, the term of this patent is extended or adjusted under 35 U.S.C. 154(b) by 24 days.

(21) Appl. No.: 16/936,712

(22) Filed: Jul. 23, 2020

(65) Prior Publication Data

US 2022/0027315 A1   Jan. 27, 2022

(51) Int. Cl.
| | |
|---|---|
| G06F 16/16 | (2019.01) |
| G06F 16/178 | (2019.01) |
| H04L 9/06 | (2006.01) |
| G06F 16/23 | (2019.01) |
| G06F 21/62 | (2013.01) |
| G06F 16/13 | (2019.01) |

(52) U.S. Cl.
CPC .......... *G06F 16/162* (2019.01); *G06F 16/134* (2019.01); *G06F 16/178* (2019.01); *G06F 16/2358* (2019.01); *G06F 21/6218* (2013.01); *H04L 9/0637* (2013.01)

(58) Field of Classification Search
None
See application file for complete search history.

(56) References Cited

U.S. PATENT DOCUMENTS

| | | | |
|---|---|---|---|
| 11,210,734 B1 * | 12/2021 | Tarmann | H04L 9/3239 |
| 11,295,359 B1 * | 4/2022 | Mullins | G06Q 20/223 |
| 2020/0389291 A1 * | 12/2020 | Xiao | H04L 67/104 |
| 2021/0272145 A1 * | 9/2021 | Tarmann | H04L 63/126 |
| 2021/0273812 A1 * | 9/2021 | Hardin | H04L 9/0822 |
| 2021/0297418 A1 * | 9/2021 | Fang | G06Q 20/389 |
| 2021/0382831 A1 * | 12/2021 | Sun | H04L 9/3221 |
| 2022/0027315 A1 * | 1/2022 | Yeh | G06F 16/162 |
| 2022/0114150 A1 * | 4/2022 | Saurabh | G06F 16/214 |
| 2022/0114663 A1 * | 4/2022 | Tarmann | G06Q 50/16 |

* cited by examiner

*Primary Examiner* — Kim T Nguyen
(74) *Attorney, Agent, or Firm* — Rosenberg, Klein & Lee

(57) ABSTRACT

The present invention provides a method of synchronous deletion for distributed storage system. According to the present invention, after a first host accesses one or more first datum, a first data list and a second data list will be created in a blockchain network corresponding to the modification of the data in the first host. Then the first data list and the second data list are used to update a second host. Accordingly, by taking advantages of the indestructibility of the blockchain technology, the existence of the first data list and the second data list will be maintained. Then the second data accessed by the second host will still be consistent even the first host has modified them. In addition, a hardware safety module can be further adopted to ensure the correctness of the execution file in the second host.

9 Claims, 9 Drawing Sheets

METHOD OF SYNCHRONOUS DELETION FOR DISTRIBUTED STORAGE SYSTEM

FIELD OF THE INVENTION

The present invention relates generally to a network data system and the method for processing data, and particularly to a method of synchronous deletion for distributed storage system.

BACKGROUND OF THE INVENTION

A distributed system is a set of computers interconnected via the network for transmitting information, communication, and coordinating the operations and hence forming a whole system. In this system architecture, the computers interact to implement a common operational result. Thereby, engineering data requiring massive calculations is divided into small data before multiple computers in a distributed system can calculate, respectively. After calculations, the lead computer integrate all calculations results to induce a data conclusion. The examples of distributed system come from different service frameworks, such as massively multiplayer online games and peer-to-peer (P2P) network applications.

Following the evolution of distribution systems and the cloudification of data storage, a distributed file system (DFS) is further developed for allowing data to be shared among multiple hosts. Thereby, the multiple users of the multiple hosts can share data and storage units. In a DFS, the client does not access of the data storage segments of the bottom layer. Instead, the client communicate with the server on the network via a specific communication protocol of the network. Thereby, both the client and the server can limit the access to the data system according to the access control list or authorization.

Based on the evolution of the P2P technology, the interplanetary file system (IPFS) is developed. IPFS is a P2P super media protocol formed by thousands of computers and is a one of distributed network technologies. For IPFS, data are stored in an IPFS formed by a plurality of network nodes on the network. The plurality of network nodes are reciprocal. Each datum can be calculated to give a single hash value. By means of a distributed hash table (DHT) algorithm, the calculated hash value is then positioned to an address of the many network nodes. Thereby, the IPFS concept is like massive data distributed at a plurality of nodes. While accessing data, use the DHT algorithm to find the address of the network nodes of the data for access. The advantage of IPFS is that even if the original network node stops services or is hacked, or the service is damaged due to natural disaster, the user still can find the required content from different network nodes.

As the prevalence of blockchains, DFS are developed to match the blockchain technology. In particular, IPFS with decentralized P2P architecture is applied extensively. Normally, in a blockchain system, data cannot be edited and deleted once written. Unfortunately, deleted subjects are usually required. In addition, the confirmation of deleted data is a challenge in a DFS. After data are stored distributedly, it is difficult to confirm each single data access like in a centralized file system, especially for a DFS using network transmission interface as the data transmission medium. In network transmission, it is hard to avoid data falsification. In the decentralized architecture, it is difficult to confirm deletion of each system node in a DFS. Besides, in current blockchain applications, massive data are stored in distributed storage systems such as IPFS or ethereum swarm. Such kinds of storage systems own the properties of a distributed system. Thereby, they do not include the function of data deletion.

Nowadays, to protect the data in a distributed storage system, various protection mechanisms are developed. For example, the media lab of the MIT and the industry cooperate to develop Blockcerts Wallet, which provides a withdrawing function for withdrawing documents. In addition, the withdrawal list is the core for performing verification withdrawing function, instead of deleting digital documents. Furthermore, data duplication between nodes of a distributed storage system also uses the network transmission interface as the data transmission medium. It is thereby difficult to make sure if data have been duplicated.

SUMMARY

An objective of the present invention is to provide a method of synchronous deletion for distributed storage system, which provides data update function for the hosts at the network nodes in a distributed storage system for ensuring data synchronization and deletion are executed correctly by the hosts at the network nodes.

Another objective of the present invention is to provide a method of synchronous deletion for distributed storage system, which provides data deletion function for the hosts at the network nodes in a distributed storage system for ensuring data deletion is executed correctly.

To achieve the above objectives, according to an embodiment of the present invention, a method of synchronous deletion for distributed storage system is provided. A first host stores a plurality of first data and a second host stores a plurality of second data. The first host and the second host store a first original list and a second original list, respectively, and correspond to an index data list of a blockchain content. The first host first adds or deletes one or more modified data according to the first original list for producing a first update list. Next, the first host updates the index data list of the blockchain content according to the first update list and produces a modified data list. Then, the second host compares the second original list according to the modified data list for deleting one or more second modified data of the plurality of second data. Thereby, a user can enable the second host to delete data firmly via the modified data list and thus avoiding data inconsistency between the first and second hosts.

According to an embodiment of the present invention, the first host and the second host are disposed in one domain or different domains.

According to an embodiment of the present invention, in the step of producing a first update list and uploading to a blockchain, the first host further produces a first verification data and uploads the first verification data to an audit control unit, and further providing a second verification data to the audit control unit; and the audit control unit audits the second host according to the first verification data and the second verification data.

According to an embodiment of the present invention, the audit control unit further audits the second host according to a data deadline list.

According to an embodiment of the present invention, the method of synchronous deletion for distributed storage system further comprises a step of comparing the second original list according to the second update list, and when the second original list is different from the second update list, the second host deleting the second modified data correspondingly.

According to an embodiment of the present invention, the method of synchronous deletion for distributed storage system further comprises a step of a third host receiving the broadcasted blockchain content and not comparing the modified data list.

According to an embodiment of the present invention, the method of synchronous deletion for distributed storage system further comprises a step of the second host self-examining the correctness of deleting the one or more second modified data according to a second update list.

According to an embodiment of the present invention, the second host includes a hardware safety module and a storage unit. The hardware safety module examines the correctness of a data execution file in the storage unit according to the second update list.

DETAILED DESCRIPTION

In order to make the structure and characteristics as well as the effectiveness of the present invention to be further understood and recognized, the detailed description of the present invention is provided as follows along with embodiments and accompanying figures.

In the following description, various embodiments of the present invention are described using figures for describing the present invention in detail. Nonetheless, the concepts of the present invention can be embodied by various forms. Those embodiments are not used to limit the scope and range of the present invention.

The present invention provides a method of synchronous deletion for distributed storage system. By means of creating data list on the blockchain network, all hosts can maintain data consistency after synchronization in a distributed storage system architecture.

Figure 1:
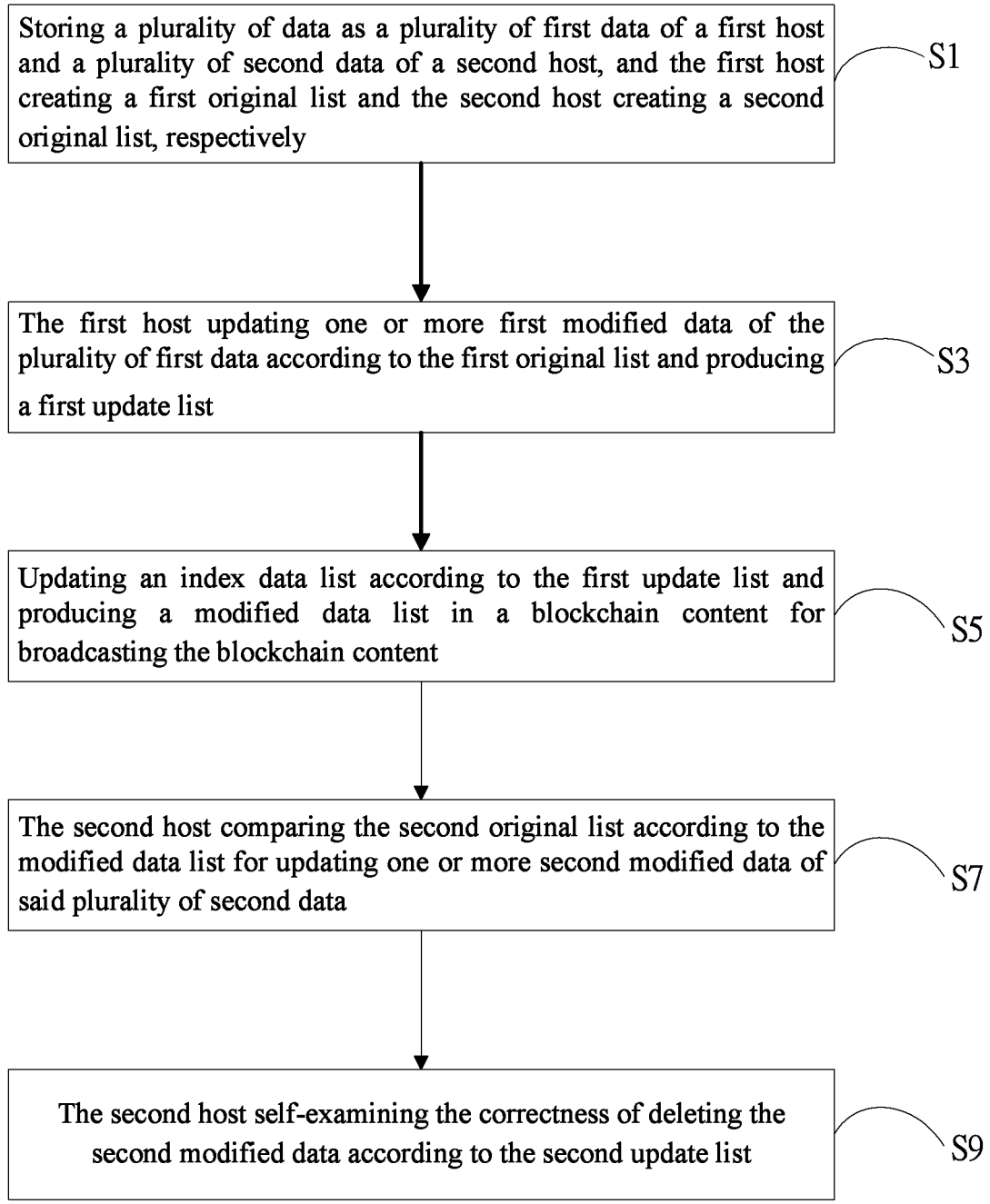
FIG. 1 shows a flowchart according to an embodiment of the present invention.

First, please refer to FIG. 1 shows a flowchart according to an embodiment of the present invention. As shown in the figure, the present invention provides a method of synchronous deletion for distributed storage system, which comprises the following steps:

Step S1: Storing a plurality of data as a plurality of first data of a first host and a plurality of second data of a second host, and the first host creating a first original list and the second host creating a second original list, respectively;

Step S3: The first host updating one or more first modified data of the plurality of first data according to the first original list and producing a first update list;

Step S5: Updating an index data list according to the first update list and producing a modified data list in a blockchain content for broadcasting the blockchain content; and Step S7: The second host comparing the second original list according to the modified data list for updating one or more second modified data of said plurality of second data.

Figure 2:
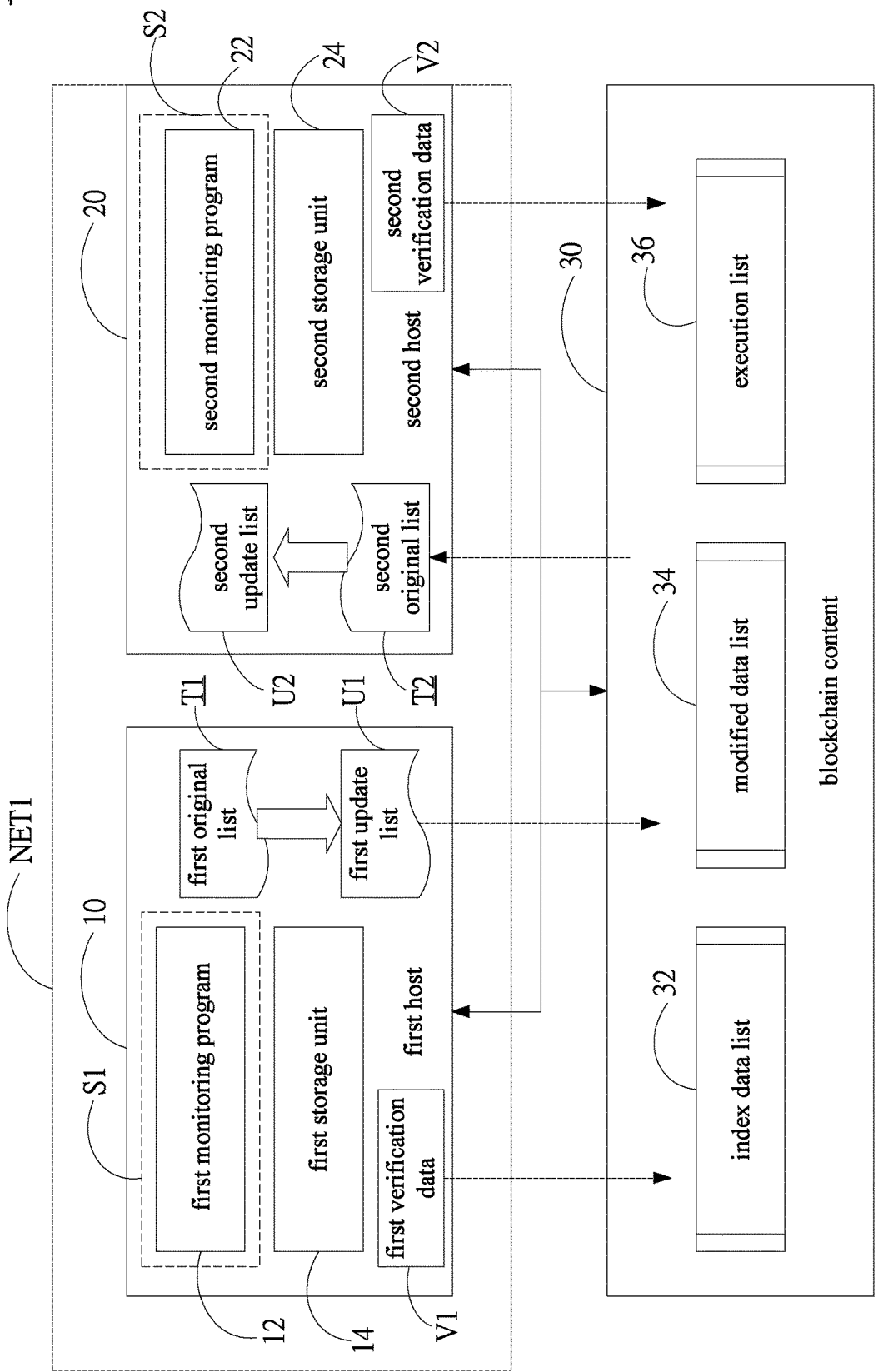
FIG. 2 shows a schematic diagram of the system according to an embodiment of the present invention.
Figure 3:
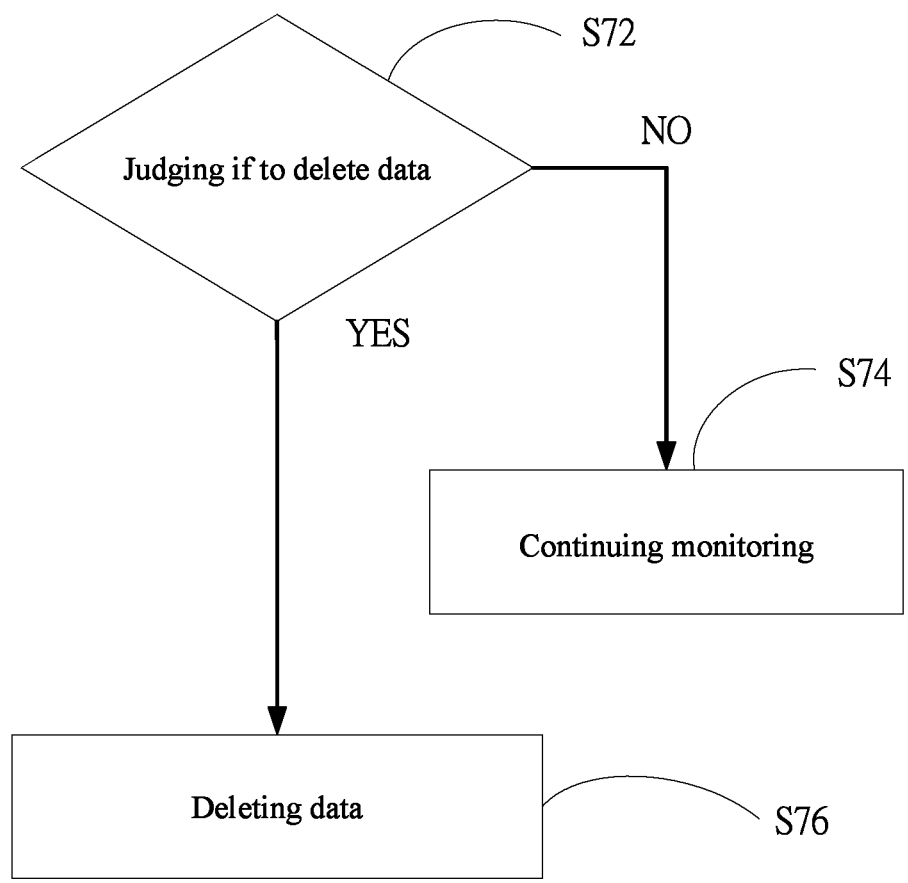
FIG. 3 shows a partial flowchart according to an embodiment of the present invention.

In the following, the distributed storage system for achieving the present invention will be described. Please refer to FIG. 2, which shows a schematic diagram of the system according to an embodiment of the present invention. As shown in FIG. 2, the distributed storage system 1 according to the present invention comprises a first host 10, a second host 20, and a blockchain content 30. In addition, the distributed storage system 1 according to the present invention further comprises a first network NET1, which is an internal network. The first host 10 and the second host 20 are both disposed in the first network NET1. The first host 10 includes a first monitoring program 12 and a first storage unit 14; the second host 20 includes a second monitoring program 22 and a second storage unit 24. The first host 10 and the second host 20 includes a first safety module S1 and a second safety module S2, respectively. The first monitoring program 12 is installed in the first safety module S1; the second monitoring program 22 is installed in the second safety module S2. The blockchain content 30 includes an index data list 32 and a modified data list 34. By using the first safety module S1 and the second safety module S2, the first monitoring program 12 and the second monitoring program 22 cannot be falsified.

Besides, the blockchain content 30 further includes an execution list 36. The first host 10 and the second host 20 are located at a network node (not shown in the figure) of a blockchain network A, respectively, for creating the blockchain content 30. The blockchain network A is a private blockchain network, an alliance blockchain network, or a public blockchain network. The first host 10 and the second host 20 have corresponding network nodes on the blockchain network A, respectively. They also own an exclusive and unique privacy key in the first safety module S1 and the second safety module S2, respectively.

As shown in the step S1, a plurality of data are stored in the first storage unit 14 of the first host 10 as a plurality of first data and in the second storage unit 24 of the second host 20 as a plurality of second data. Then the first host 10 and the second host creates a first original list T1 and a second original list T2, respectively. The first original list T1 and the second original list T2 correspond to the index data list 32. As shown in the step S3, the first host 10 according to the present embodiment modifies the first data stored in the first storage unit 14 of the first host 10, for example, adding a document to the first storage unit 14 or deleting a datum in the first storage unit 14. Thereby, the first host 10 produces a first update list U1 according to the first original list T1 and the modified data. The first original list U1 corresponds to all of the original first data in the first host 10; the first update list U1 corresponds to all of the modified data in the first host 10. Due to the modification of the data in the first host 10, the first monitoring program 12 uploads the first update list U1 to the blockchain content 30 at the corresponding network node. The first monitoring program 12 can further upload the corresponding first verification data V1 to the corresponding node in the blockchain network A. As shown in the step S5, the first monitoring program 12 updates the index data list 32 of the blockchain content 30 according to the first update list U1, and produces the modified data list 34 in the blockchain content 30 according to the modified data and the first update list U1 provided by the Step S3. Then, the host 10 can broadcast the blockchain content 30 via the corresponding network node in the blockchain network A. Thereby, the other network nides in the same blockchain can acquire the updated blockchain content 30 as well. The index data list 32 corresponds to all the updated data stored in the first storage unit 14 of the first host 10; the modified data list 34 corresponds to the modified data stored in the first storage unit 14 of the first host 10. As shown in the step S7, since the second host 20 corresponds to a network node in the blockchain network A and the second monitoring program 22 of the second host 20 monitors the data in the second storage unit 24, the second host 20 acquires the updated blockchain content 30 from the corresponding network node and compares the index data list 32 and the modified data list 34 in the blockchain content 30 with the second update list T2 for producing a second update list U2. The second host 20 compares the second original data list T2 and the second update list U2 of the data in the second storage unit 24 for deleting data. For example, the second host 20 deletes the corresponding data according to the comparison between the second original data list T2 and the second update list U2. The second monitoring program 22 uploads a second verification data V2 to the blockchain content 30 according to the deleted data in the second storage unit 24.

As shown in Figure, the step S7 further comprises:
Step S72: Judging if to delete data;
Step S74: Continuing monitoring; and
Step S76: Deleting data.

As shown in the step S72, the second monitoring program 22 monitors all the data in the second storage unit 24 of the second host 20 according to the second original list T2 and the second update list U2 for judging if the second storage unit 24 should delete data. When the second update list U2 is not different from the second original list T2, the step S74 is executed. When the second update list U2 is different from the second original list T2 and data should be deleted, the step S76 is executed. As shown in the step S74, when the second host 20 need not add data, the second host 20 continues to monitor the data stored in the second storage unit 24. As shown in the step S76, When the second update list U2 is different from the second original list T2 and data should be deleted, the data to be deleted will be listed in the second update list U2. Then the second host 20 also deletes the corresponding data in the second storage unit 24.

In addition, after the step S7, the present invention further comprises a step of:
Step S9: The second host self-examining the correctness of deleting the second modified data according to the second update list.

In the step S9, the second host 20 further examines the correctness of the data execution file in the second storage unit 24 according to the second update list U2 via the hardware safety module 26. In other words, the hardware safety module 26 will judge data incompleteness occurred in the data deletion process for the second storage unit 24. When the data execution file is incorrect, the hardware safety module 26 will further recover the connectivity of the data execution file.

Moreover, any host with monitoring permission judges the data update state of the second host 20 according to the execution list 36 of the blockchain content 30 as well as judging if the first host 10 continues updating according to the execution list 36. Then the first monitoring program 12 can extract the data list in the first storage unit 14. In addition, the modified data list 34 can further include multiple digitally signed documents. When the modified data list 34 lists the deleted data, the blockchain network 30 will not list the deleted data not finishing the digitally signed documents in the modified data list 34. Thereby, the second monitoring program 22 will not delete the corresponding data.

Figure 4:
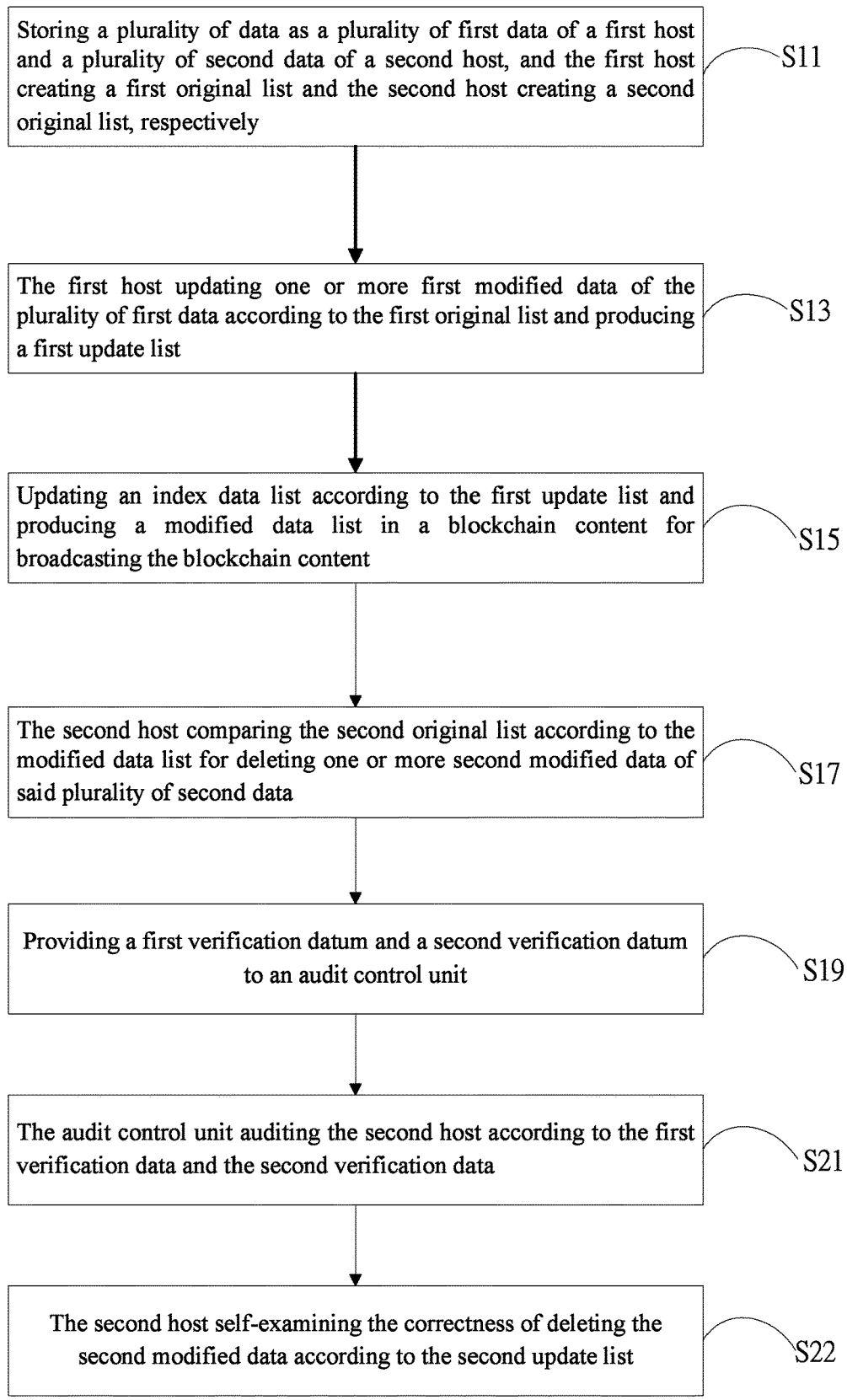
FIG. 4 shows a flowchart according to another embodiment of the present invention.

In the following, the flow of a method of synchronous deletion for distributed storage system according to another embodiment of the present invention will be described. Please refer to FIG. 4, the flow according to the present invention comprises the following steps:

Step S11: Storing a plurality of data as a plurality of first data of a first host and a plurality of second data of a second host, and the first host creating a first original list and the second host creating a second original list, respectively;
Step S13: The first host updating one or more first modified data of the plurality of first data according to the first original list and producing a first update list;
Step S15: Updating an index data list according to the first update list and producing a modified data list in a blockchain content for broadcasting the blockchain content;
Step S17: The second host comparing the second original list according to the modified data list for deleting one or more second modified data of said plurality of second data;
Step S19: Providing a first verification data and a second verification data to an audit control unit; and
Step S21: The audit control unit auditing the second host according to the first verification data and the second verification data.

Figure 5:
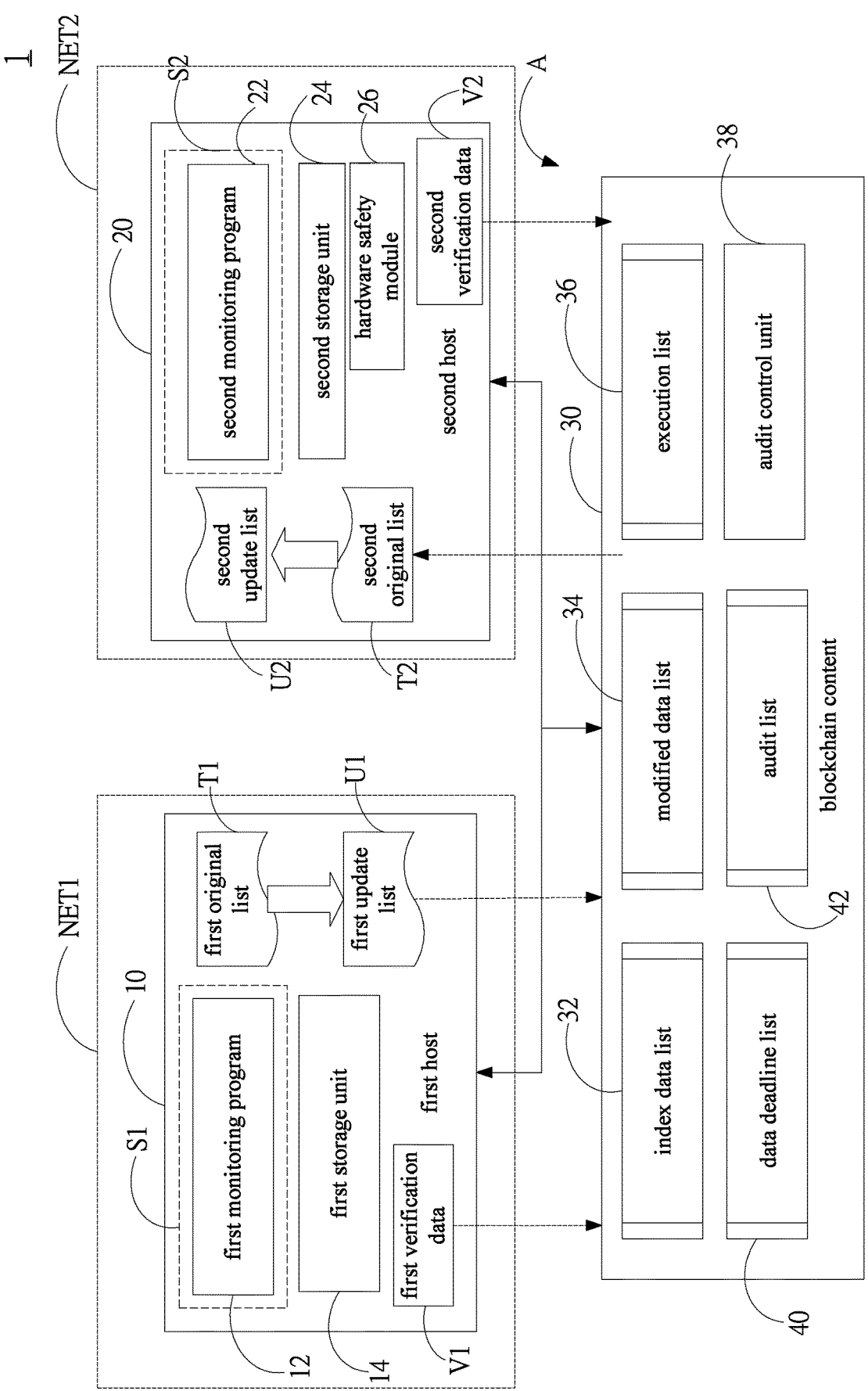
FIG. 5 shows a schematic diagram of the system according to another embodiment of the present invention.

Please refer to FIG. 5. The difference between FIG. 2 and FIG. 5 is that in FIG. 5, the second host 20 further includes a hardware safety module 26, and the blockchain content 30 further includes an audit control unit 38 and a data deadline list 40. Besides, the first host 10 and the second host 20 are located in the first network NET1 and the second network NET2, respectively. Thereby, for the first host 10, the second host 20 is located in an external network. In the blockchain network A, any host can acquire the audit permission and execute the audit control unit 38 for auditing the second storage unit 24 of the second host 20.

The steps S11 to S17 are identical to the steps S1 to S7 for deleting data. Hence, the details will not be described again. As shown in the step S13, when adding or deleting the modified data in the first storage unit 14 of the first host 10, the first monitoring program 12 of the first host 10 will produce the first verification data V1 and synchronize it to the blockchain content 30. In the step S17, the second monitoring program 22 deletes the second data stored in the second storage unit 24 according to the difference between the second update list U2 and the second original list T2. Furthermore, as shown in the step S19, the second host 20 produces a second verification data correspondingly and synchronizes it to the blockchain content 30. As shown in the step S21, the audit control unit 38 audits all the data stored in the second storage unit 24 of the second host 20 according to the first verification data V1 and the second verification data V2. Besides, the audit control unit 38 further produces the data deadline list 40 according to the index data list 32 and the modified data list 34, and audits all the data stored in the second storage unit 24 of the second host 20 using the data deadline list 40 for ensuring if the second storage unit 24 stores expired data.

Figure 6:
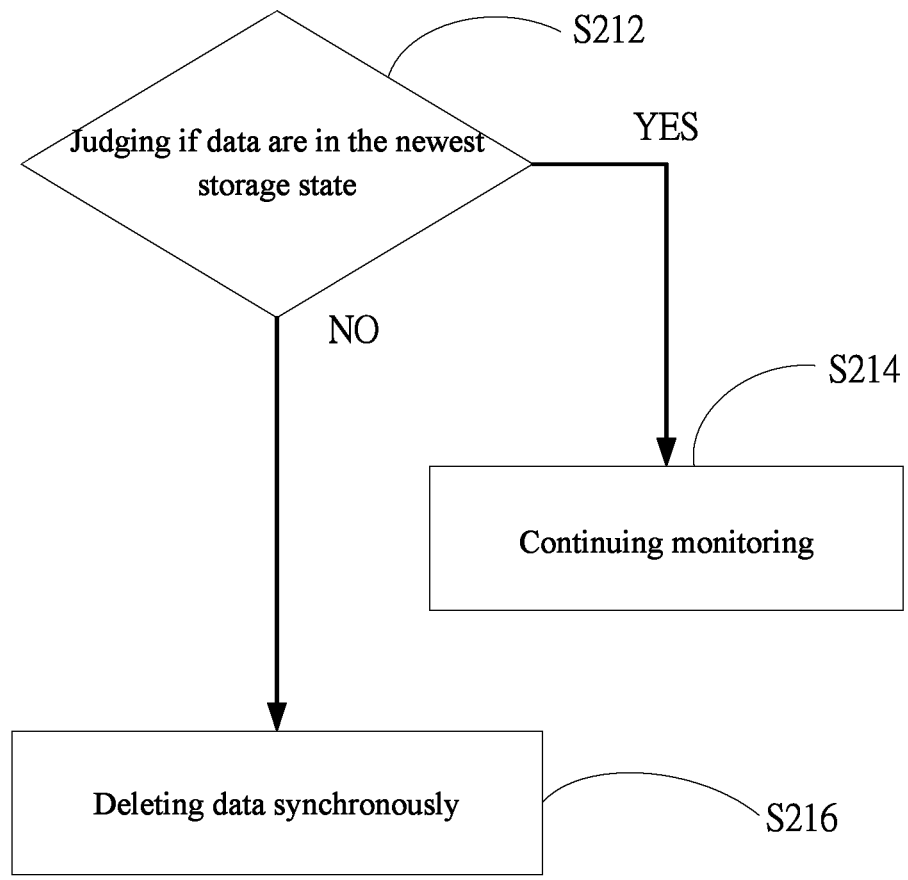
FIG. 6 shows a partial flowchart according to another embodiment of the present invention.

In the step S21, as shown in FIG. 6, the method of synchronous deletion for distributed storage system according to the present invention further comprises:

Step S212: Judging if data are in the newest storage state;
Step S214: Continuing monitoring; and
Step S216: Deleting data synchronously.

In the step S212, the audit control unit 38 judges if the data stored in the second storage unit 24 correspond to data stored in the first storage unit 14 according to the first verification data V1 and the second verification data V2 and are in the newest storage state. When the data are in the newest state, the step S214 is executed. When one of the data is judged to be a modified data, the step S216 is executed. In the step S214, the second monitoring program 24 will continue to monitor the second storage unit 24 of the second host 20. In the step S216, after the audit control unit 38 audits that the second host 20 is not in the newest state, the audit control unit 38 submits a request to the hardware safety module 26 for driving the hardware safety module 26 to delete data. In addition, the audit control unit 38 can further judge if a datum is an expired data in the data deadline list 40. If so, the audit control unit 38 submits a request to the hardware safety module 26 for driving the hardware safety module 26 to delete data. And enabling the data in the second storage unit 24 are in the newest state. For example, the second host 20 deletes all the data in the second storage unit 24 for making the data stored in the second host 20 be consistent with the data stored in the first host 10.

In addition, after the step S21, the present invention further comprises a step of:

Step S22: The second host self-examining the correctness of deleting the second modified data according to the second update list.

In the step S22, the second host 20 further examines the correctness of the data execution file in the second storage unit 24 according to the second update list U2 via the hardware safety module 26. In other words, the hardware safety module 26 will judge data incompleteness occurred in the data deletion process for the second storage unit 24. When the data execution file is incorrect, the hardware safety module 26 will further recover the connectivity of the data execution file.

In addition, the blockchain network 30 can further includes an audit list 42 and access the first verification data V1 and the second verification data V2. Each time when the first host 10 finishes one cycle of data deletion, the first monitoring program 12 or the first safety module S1 produces the first verification data V1 to the blockchain content 30 and storing in the audit list 42. Each time when the second host 20 finishes one cycle of data deletion, the second monitoring program 22 or the second safety module S2 produces the second verification data V2 to the blockchain content 30 and storing in the audit list 42. Then the audit control unit 38 can audit if data updates on the data deadline list 40 or the execution list 36 are executed firmly using the audit list 42 and thus avoid manual auditing. Thereby, manual comparison operations can be reduced and data safety can be enhanced. The first data stored in the first storage unit 14 and the second data stored in the second storage unit 24 as described above are data in the system architecture of an IPFS.

Figure 7:
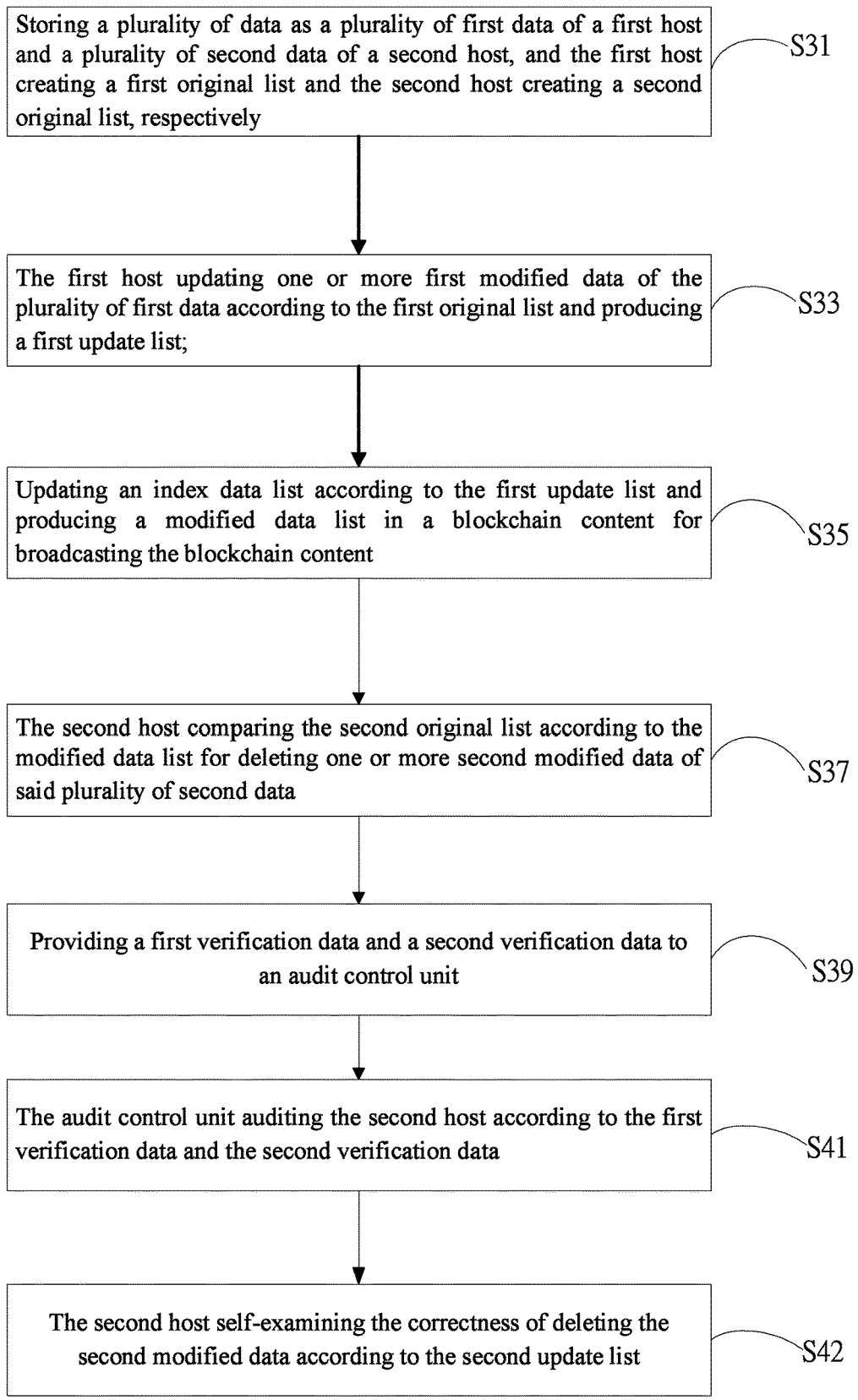
FIG. 7 shows a flowchart according to another embodiment of the present invention.

Please refer to FIG. 7, which shows a flowchart according to another embodiment of the present invention. The present invention comprises the following steps:

Step S31: Storing a plurality of data as a plurality of first data of a first host and a plurality of second data of a second host, and the first host creating a first original list and the second host creating a second original list, respectively;

Step S33: The first host updating one or more first modified data of the plurality of first data according to the first original list and producing a first update list;

Step S35: Updating an index data list according to the first update list and producing a modified data list in a blockchain content for broadcasting the blockchain content;

Step S37: The second host comparing the second original list according to the modified data list for deleting one or more second modified data of said plurality of second data;

Step S39: Providing a first verification data and a second verification data to an audit control unit; and Step S41: The audit control unit auditing the second host according to the first verification data and the second verification data.

Figure 8:
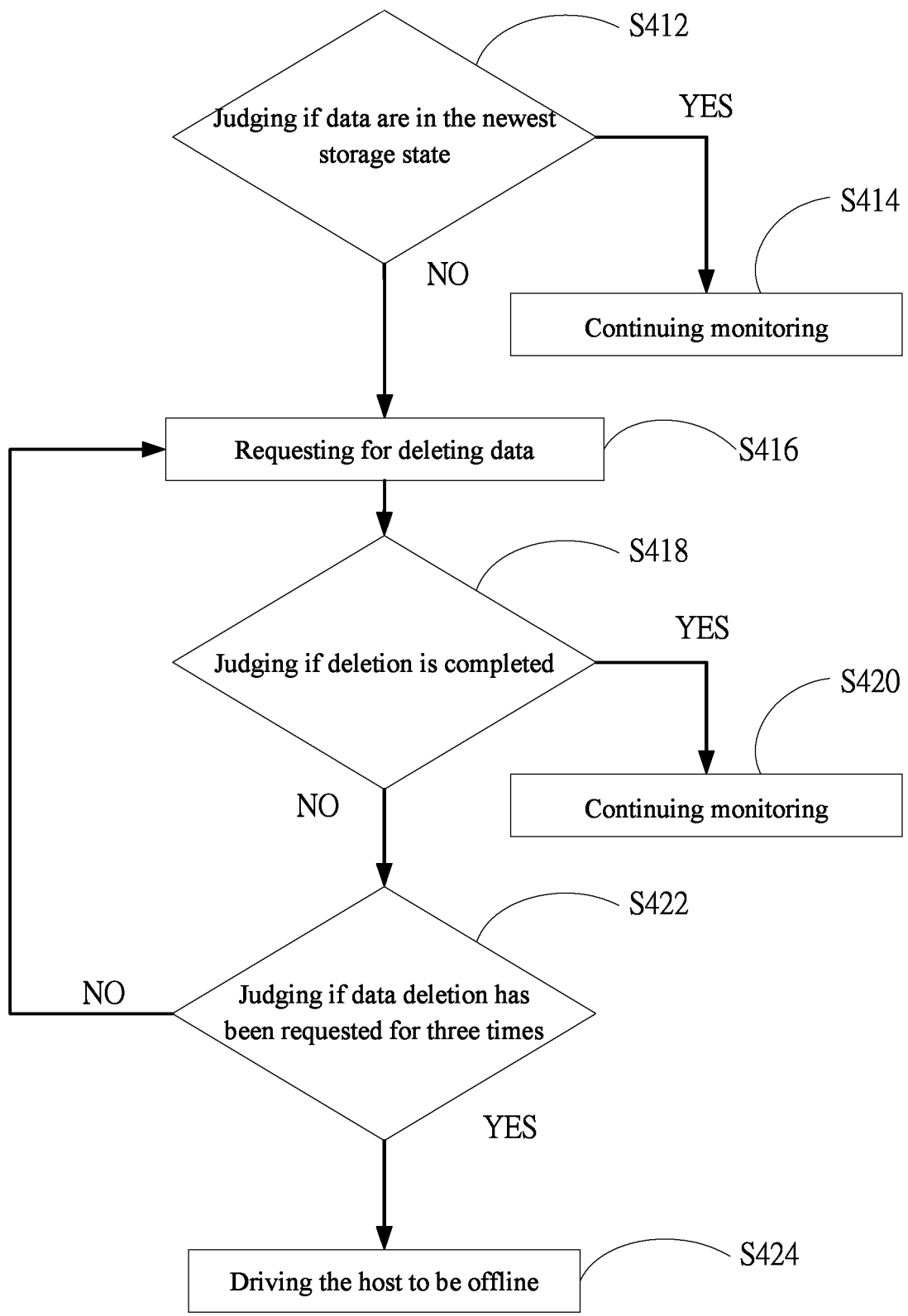
FIG. 8 shows a partial flowchart according to another embodiment of the present invention.

The steps S31 to S39 are identical to the steps S11 to S19 as described above. Hence, the details will not be repeated. The difference between the steps S41 and S21 is that the step S41 further includes a self-destruct function. Please refer to FIG. 5 as well. The audit control unit 38 according to the present invention audits the second host 20 according to the first verification data V1 and the second verification data V2 in the audit list 42. When the first verification data V1 is different from the second verification data V2, the audit control unit 38 submits a deletion request to the second host 20 for requesting the second safety module S2 or the second monitoring program 22 therein to execute the corresponding data deletion. As shown in FIG. 8, the step S41 further comprises:

Step S412: Judging if data are in the newest storage state;
Step S414: Continuing monitoring;
Step S416: Requesting for deleting data;
Step S418: Judging if deletion is completed;
Step S420: Continuing monitoring;
Step S422: Judging if data deletion has been requested for three times; and
Step S424: Driving the host to be offline.

The steps S412 to S416 are identical to the steps S212 to S216. Hence, the details will not be repeated. In the step S418, the audit control unit 38 further audits if the second host 20 has finished synchronous data deletion. If so, the step S420 will be executed. If not, the step S422 will be executed. In the step S420, the second monitoring program 24 will continue to monitor the second storage unit 24 of the second host 20. In the step S422, the second monitoring program 24 will judge if the audit control unit 38 has requested synchronous data deletion for three times. If not, the step S416 will be executed. If so, the step S424 will be executed. In the step S424, the audit control unit 38 marks in the execution list 36 that the second host 20 should be offline. Thereby, the second monitoring program 22 will clear the second data stored in the second storage unit 24 according to the mark and enable the should-be-offline second host 20 to stop subsequent operations. Thereby, the should-be-off second host 20 can go offline from the blockchain network A firmly.

The first host 10 and the second host 20 as described above include a privacy key of the corresponding blockchain network A, respectively, for accessing the blockchain network from the nodes without data falsification and providing confirmation of data correctness. In addition, both of the first and second monitoring programs 12, 22 in the first and second safety modules S1, S2 of the first and second hosts 10, 20 include a self-destruct function. After the audit control unit 38 submits the same request of synchronous deletion to the first or second host 10, 20 for three times, the audit control unit 38 marks in the execution list 36 that the host should be offline. Thereby, when the corresponding monitoring program reads the mark that the host should be offline from the corresponding network node in the blockchain network A, the monitoring program in the safety module will delete all the data in the corresponding storage unit for stopping subsequent operations of the should-be-offline host. Thereby, the should-be-off second host can go offline from the blockchain network A firmly.

In addition, after the step S41, the present invention further comprises a step of:

Step S42: The second host self-examining the correctness of deleting the second modified data according to the second update list.

In the step S42, the second host 20 further examines the correctness of the data execution file in the second storage unit 24 according to the second update list U2 via the hardware safety module 26. In other words, the hardware safety module 26 will judge data incompleteness occurred in the data deletion process for the second storage unit 24. When the data execution file is incorrect, the hardware safety module 26 will further recover the connectivity of the data execution file.

Figure 9:
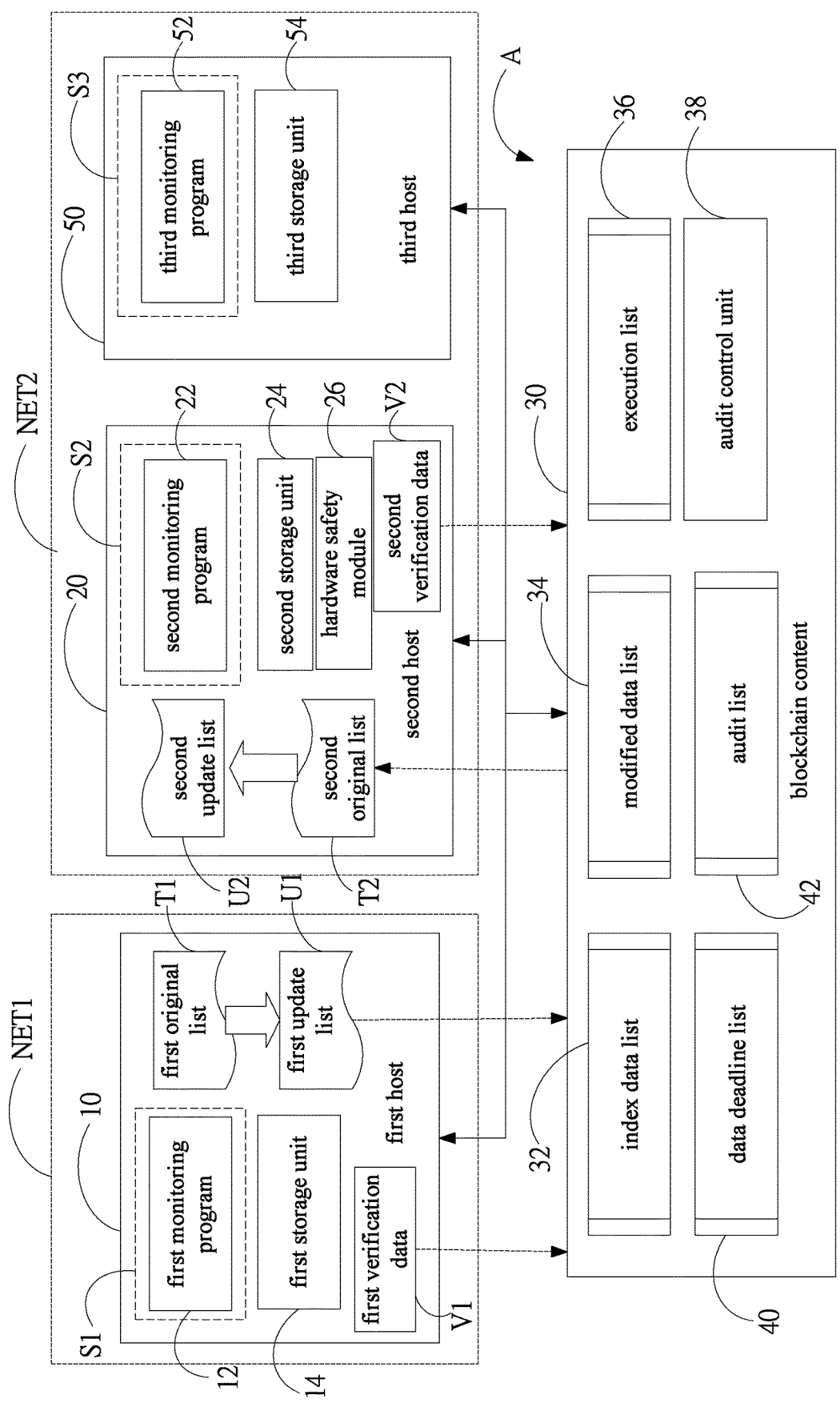
FIG. 9 shows a schematic diagram of the system according to another embodiment of the present invention.

Please refer to FIG. 9, which shows a schematic diagram of the system according to another embodiment of the present invention. The difference between FIG. 5 and FIG. 9 is that FIG. 9 further includes a third host 50. The third host 50 includes a third monitoring program 52 and a third storage unit 54. The third monitoring program 52 is installed in a third safety module S3. Because the host 50 is an offline host, after the first host 10 executes the step S35, the third host 50 does not continue to execute the step S37 for receiving the broadcasted blockchain content 30, comparing the modified data list 34, and executing synchronous deletion.

To sum up, the present invention provides a method of synchronous deletion for distributed storage system, which includes monitoring programs for automatic and assistive monitoring of the storage units in respective hosts. Thereby, the following benefits are achieved:

1. Providing corresponding data updates via data lists;
2. Ensuring content consistency among the nodes of IPFS; and
3. Reducing manual comparison operations and enhancing safety by automatic auditing mechanisms.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A method of synchronous deletion for distributed storage system, comprising steps of:

storing a plurality of data as a plurality of first data of a first host and a plurality of second data of a second host, said first host creating a first original list and said second host creating a second original list, respectively, and said first original list and said second original list corresponding to an index data list of a blockchain content in a blockchain network;

said first host modifying one or more data of said first data to produce a first update list according to said first original list and modified data in said first host;

said first host uploading said first update list to said blockchain network to update said index data list according to said first update list and to produce a modified data list in said blockchain content for said first host broadcasting said blockchain content with said modified data list in said blockchain network; and said second host obtaining said blockchain content with said modified data list from said blockchain network and comparing said second original list with said modified data list to generate a second update list for deleting one or more data of said second data, and said one or mode data in modified of said first data corresponding to said one or more data in modified of said second data.

2. The method of synchronous deletion for distributed storage system of claim 1, wherein said first host and said second host are disposed in one domain or different domains.

3. The method of synchronous deletion for distributed storage system of claim 1, where in said step of said first host modifying one or more data of said plurality of first data to produce a first update list according to said first original list and modified data in said first hos, said first host further produces a first verification data and uploads said first verification data to an audit control unit in said blockchain content; and further comprising steps of:

said second host producing and uploading a second verification data to said audit control unit; and said audit control unit auditing all of said second data stored in said second host according to said first verification data and said second verification data.

4. The method of synchronous deletion for distributed storage system of claim 3, where in said step of said audit control unit auditing all of said second data stored in said second host according to said first verification data and said second verification data, said audit control unit further audits all of said second data stored in said second host according to a data deadline list for all of said second data.

5. The method of synchronous deletion for distributed storage system of claim 3, and further comprising steps of when said audit control unit audit said second host according to said first verification data and said second verification data and has requested data deletion for three times, said audit control unit marking in an execution list that said second host should be offline; and said second host deleting said plurality of second data according to said execution list.

6. The method of synchronous deletion for distributed storage system of claim 1, and further comprising a step of comparing said second original list a with said second update list, and when said second original list is different from said second update list, said second host deleting said one or more data of said data correspondingly.

7. The method of synchronous deletion for distributed storage system of claim 1, and further comprising a step of a third host receiving said broadcasted blockchain content and not comparing said modified data list.

8. The method of synchronous deletion for distributed storage system of claim 1, and further comprising a step of said second host self-examining the correctness of deleting said one or more second modified data according to a second update list.

9. The method of synchronous deletion for distributed storage system of claim 8, wherein said second host includes a hardware safety module and a storage unit; said second data stored in said storage unit, said hardware safety module examines the correctness of a data execution file in said storage unit according to said second update list.

* * * * *